US012695795B2

(12) United States Patent
Zhang et al.

(10) Patent No.: US 12,695,795 B2
(45) Date of Patent: Jul. 28, 2026

(54) METHOD AND APPARATUS FOR SESSION MANAGEMENT FUNCTION RESELECTION

(71) Applicant: Telefonaktiebolaget LM Ericsson (publ), Stockholm (SE)

(72) Inventors: Wen Zhang, Shanghai (CN); Jinyin Zhu, Shanghai (CN); Juying Gan, Shanghai (CN); Yunjie Lu, Shanghai (CN); Qiong Song, Shanghai (CN); Xiaoming Li, Shanghai (CN); Wu Wang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 326 days.

(21) Appl. No.: 18/555,402

(22) PCT Filed: Apr. 13, 2022

(86) PCT No.: PCT/CN2022/086618
§ 371 (c)(1),
(2) Date: Oct. 13, 2023

(87) PCT Pub. No.: WO2022/218343
PCT Pub. Date: Oct. 20, 2022

(65) Prior Publication Data
US 2024/0195846 A1     Jun. 13, 2024

(30) Foreign Application Priority Data
Apr. 14, 2021   (WO) ................ PCT/CN2021/087309

(51) Int. Cl.
*H04W 36/00* (2009.01)
*H04L 65/1069* (2022.01)
(52) U.S. Cl.
CPC ..... *H04L 65/1069* (2013.01); *H04W 36/0011* (2013.01)

(58) Field of Classification Search
CPC ..... H04L 1/1642; H04L 47/34; H04L 1/1607; H04L 65/1069; H04L 12/12; H04L 67/12;
(Continued)

(56) References Cited

U.S. PATENT DOCUMENTS

2019/0261233 A1* 8/2019 Duan ................ H04W 36/0072
2019/0313311 A1* 10/2019 Huang-Fu ......... H04W 36/0033
(Continued)

FOREIGN PATENT DOCUMENTS

CN        110431881 A      11/2019
CN        111373792 A      7/2020
(Continued)

OTHER PUBLICATIONS

International Search Report and Written Opinion dated Jul. 11, 2022 issued in PCT Application No. PCT/CN2022/086618 filed Apr. 13, 2022, consisting of 8 pages.
(Continued)

*Primary Examiner* — Nathan S Taylor
(74) *Attorney, Agent, or Firm* — Weisberg I.P. Law, P.A.

(57) ABSTRACT

A method and apparatus for session management function reselection. A method performed by an access and mobility function includes selecting a second session management function (SMF) to serve a session of a user equipment (UE). The session of the UE is currently served by a first SMF and an access network. The method further includes sending a create session management context request comprising a reason of selecting the second SMF to serve the session of the UE to the second SMF. The reason indicates that the session of the UE is still served by the access network. The method further includes receiving a create session management context response comprising a session resource modify request from the second SMF. The session resource modify request includes access network tunnel information of the
(Continued)

access network. The method further includes sending the session resource modify request to the access network.

23 Claims, 12 Drawing Sheets

(58) Field of Classification Search
CPC ............... H04W 28/06; H04W 28/082; H04W 28/0865; H04W 28/09; H04W 76/15; H04W 88/06; H04W 36/0011; H04W 36/12; H04W 76/12; H04W 76/22; H04W 48/18; H04W 36/00; H04W 4/029; H04W 4/70; H04W 4/80; H04W 40/10; H04W 40/12; H04W 40/22; H04W 52/0219; H04W 52/0261; H04W 52/028; H04W 52/0296; H04W 76/14; H04W 8/005; H04W 84/18; H04W 84/22; H04W 88/04; H04W 52/02; H04W 8/00; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20; H04Q 9/00

See application file for complete search history.

(56) References Cited

U.S. PATENT DOCUMENTS

| | | | | |
|---|---|---|---|---|
| 2020/0112898 A1* | 4/2020 | Ramle | | H04W 8/08 |
| 2020/0322857 A1* | 10/2020 | Park | | H04W 76/22 |
| 2021/0022024 A1* | 1/2021 | Yao | | H04W 24/08 |
| 2021/0392704 A1* | 12/2021 | Xu | | H04W 48/18 |
| 2022/0015159 A1* | 1/2022 | Li | | H04W 48/08 |
| 2022/0312309 A1* | 9/2022 | Han | | H04W 48/18 |
| 2023/0025675 A1* | 1/2023 | Jia | | H04W 76/32 |
| 2023/0188949 A1* | 6/2023 | Jia | | H04L 12/189 |
| | | | | 455/458 |
| 2024/0121592 A1* | 4/2024 | Hong | | H04W 60/005 |

FOREIGN PATENT DOCUMENTS

| | | | | |
|---|---|---|---|---|
| KR | 20200018956 A | 2/2020 | | |
| WO | WO-2019219752 A1 * | 11/2019 | | H04W 76/12 |
| WO | 2021/012736 | 1/2021 | | |
| WO | 2021/066346 A1 | 8/2021 | | |

OTHER PUBLICATIONS

3GPP TS 23.501 V17.0.0 (Mar. 2021) 3rd Generation Partnership Project; Technical Specification Group Services and System Aspects; System architecture for the 5G System (5GS); Stage 2 (Release 17), consisting of 489 pages.
3GPP TS 23.502 V16.6.0 (Sep. 2020) 3rd Generation Partnership Project; Technical Specification Group Services and System Aspects; Procedures for the 5G System (5GS); Stage 2 (Release 16), consisting of 597 pages.
3GPP TS 23.502 V17.0.0 (Mar. 2021) 3rd Generation Partnership Project; Technical Specification Group Services and System Aspects; Procedures for the 5G System (5GS); Stage 2 (Release 17), consisting of 646 pages.
3GPP TS 29.502 V16.6.0 (Dec. 2020) 3rd Generation Partnership Project; Technical Specification Group Core Network and Terminals; 5G System; Session Management Services; Stage 3 (Release 16), consisting of 280 pages.
3GPP TS 38.413 V16.5.0 (Apr. 2021) 3rd Generation Partnership Project; Technical Specification Group Radio Access Network; NG-RAN; NG Application Protocol (NGAP) (Release 16), consisting of 473 pages.
3GPP TSG-WG SA2#143E Meeting emeeting; S2-2100791 (revision of S2-200xxxx); Change Request 23.502 CR 2562 rev Current Version: 16.7.0; Title: Add N3 Tunnel Information in SM Context; Source to WG: ZTE; Source to TSG: SA2; Work Item Code: eNS; Category: F; emeeting, Feb 24-Mar. 9, 2021, consisting of 5pages.
3GPP TSG-CT WG4 Meeting #103-e C4-212252; Change Request 29.502 CR 0441 rev—Current version 17.0.0; Title: NG-RAN Tunnel Information During mobility registration with I-SMF/V-SMF Change; Source to WG: Huawei; Source to TSG: CT4; Work Item Code: eNS; Category: A; E-Meeting, Apr. 14-24, 2021, consisting of 24 pages.
Extended European Search Report dated Jan. 30, 2025 issued in corresponding European Patent Application No. 22787565.5, consisting of 15 pages.
3GPP TSG-CT WG4 Meeting #97E C4-202004 Source: Chairman, TSG-CT WG4 Title: Proposed allocation of documents to agenda items for CT4#97E: Status at eve of meeting; Agenda item: 2 Document for: Information; E-Meeting; Apr. 15-23, 2020, consisting of 54 pages.

\* cited by examiner

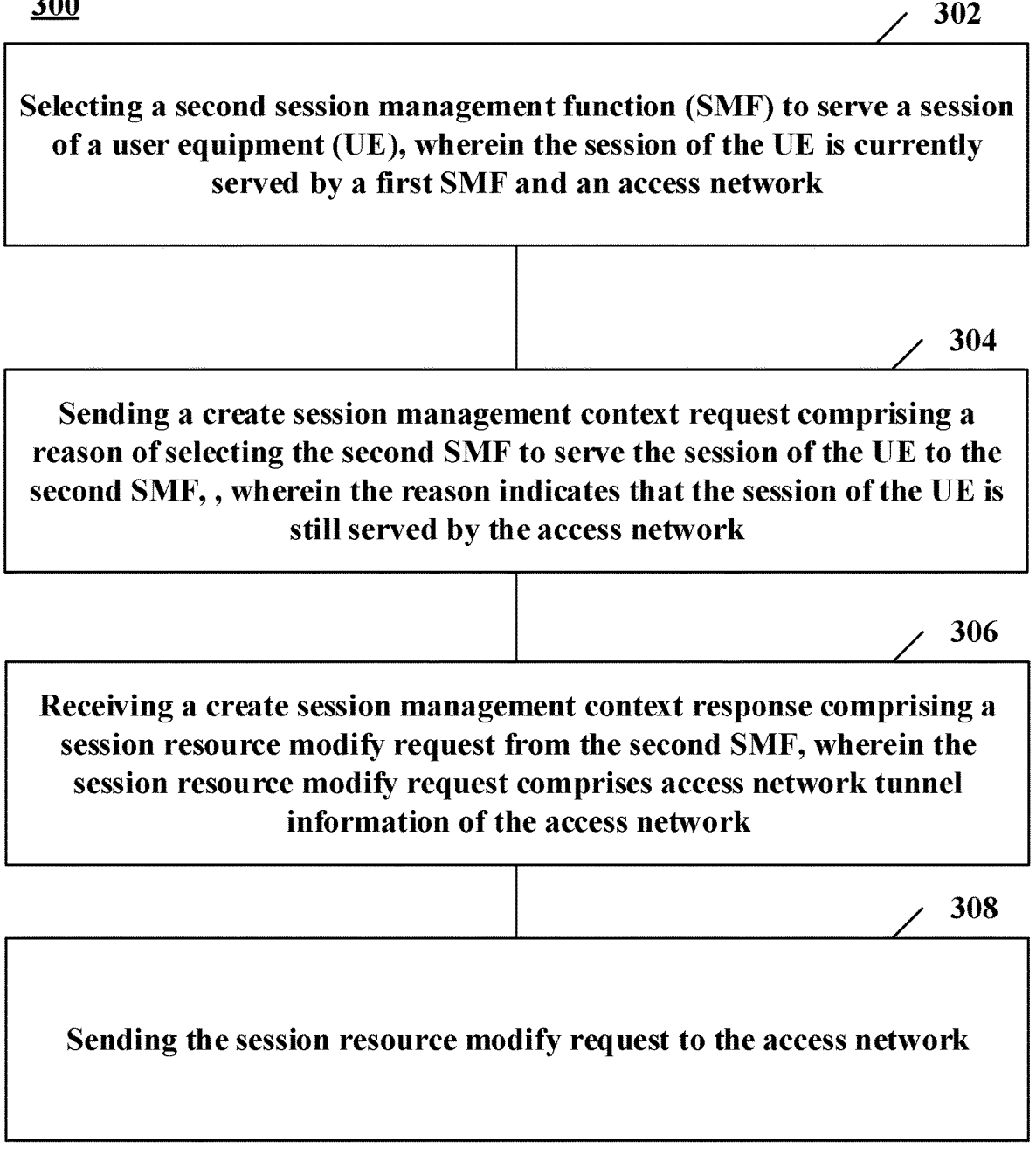

300

302

Selecting a second session management function (SMF) to serve a session of a user equipment (UE), wherein the session of the UE is currently served by a first SMF and an access network

304

Sending a create session management context request comprising a reason of selecting the second SMF to serve the session of the UE to the second SMF, , wherein the reason indicates that the session of the UE is still served by the access network

306

Receiving a create session management context response comprising a session resource modify request from the second SMF, wherein the session resource modify request comprises access network tunnel information of the access network

308

Sending the session resource modify request to the access network

Figure 4:
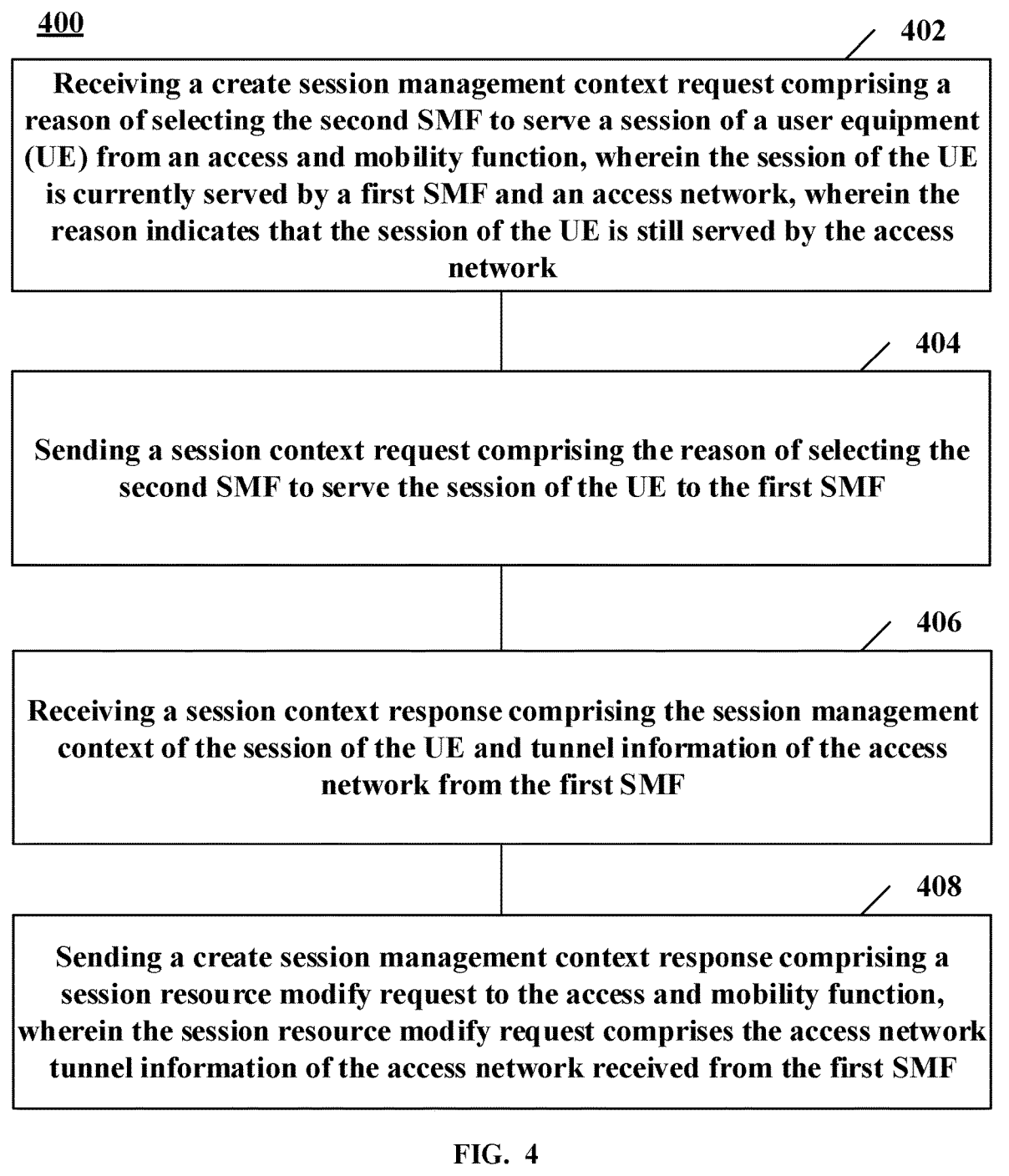

Receiving a create session management context request comprising a reason of selecting the second SMF to serve a session of a user equipment (UE) from an access and mobility function, wherein the session of the UE is currently served by a first SMF and an access network, wherein the reason indicates that the session of the UE is still served by the access network

/ 404

Sending a session context request comprising the reason of selecting the second SMF to serve the session of the UE to the first SMF

/ 406

Receiving a session context response comprising the session management context of the session of the UE and tunnel information of the access network from the first SMF

/ 408

Sending a create session management context response comprising a session resource modify request to the access and mobility function, wherein the session resource modify request comprises the access network tunnel information of the access network received from the first SMF

Receiving a session context request comprising a reason of selecting a second SMF to serve a session of a user equipment (UE) from a second SMF, wherein the session of the UE is currently served by the first SMF and an access network

/ 504

Sending a session context response comprising the session management context of the session of the UE and tunnel information of the access network to the second SMF based on the reason of selecting the second SMF to serve the session of the UE

METHOD AND APPARATUS FOR SESSION MANAGEMENT FUNCTION RESELECTION

CROSS-REFERENCE TO RELATED APPLICATIONS

This application is a Submission Under 35 U.S.C. § 371 for U.S. National Stage Patent Application of International Application No.: PCT/CN2022/086618, filed Apr. 13, 2022 entitled "METHOD AND APPARATUS FOR SESSION MANAGEMENT FUNCTION RESELECTION," which claims priority to PCT/CN2021/087309 filed Apr. 14, 2021, the entireties of both of which are incorporated herein by reference

TECHNICAL FIELD

The non-limiting and exemplary embodiments of the present disclosure generally relate to the technical field of communications, and specifically to methods and apparatuses for session management function reselection.

BACKGROUND

This section introduces aspects that may facilitate a better understanding of the disclosure. Accordingly, the statements of this section are to be read in this light and are not to be understood as admissions about what is in the prior art or what is not in the prior art.

In communication networks for example NR (new radio) as defined by 3rd Generation Partnership Project (3GPP), a PDU (protocol data unit) session may be established between a UE (user equipment) and a DN (Data Network). The PDU session may be served by several network devices or functions. For example, the PDU session may be served by AN (access network), UPF (user plane function), AMF (access and mobility function), SMF (session management function), etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In some cases such as mobility or handover, another network device or function may be selected to serve the PDU session. As described in clause 5.34.3 of 3GPP TS 23.501 V17.0.0, the disclosure of which is incorporated by reference herein in its entirety, the AMF is responsible of detecting when to add or to remove an I-SMF (Intermediate SMF) or a V-SMF (visited) for a PDU Session. For this purpose, the AMF gets from NRF (Network Repository Function) information about the Service Area and supported DNAI(s)(DN Access Identifier) of SMF(s). For example, during mobility events such as Hand-Over or AMF change, if the service area of the SMF does not include the new UE location, then the AMF selects and inserts an I-SMF which can serve the UE location and the S-NSSAI (Single Network Slice Selection Assistance Information). If the AMF detects that the SMF cannot serve the UE location (e.g. due to mobility), then the AMF selects a new I-SMF serving the UE location. If the existing I-SMF (or V-SMF) cannot serve the UE location (e.g. due to mobility) and the service area of the SMF does not include the new UE location (or the PDU Session is Home Routed), then the AMF initiates an I-SMF (or V-SMF) change.

According to the PCC (Policy and Charging Control) rules related with AF (application function) influence traffic mechanism regarding target DNAI(s) when the PDU Session has been established, the SMF determines the target DNAI(s) which are applicable to the current UE location. If current (I-)SMF cannot serve the target DNAI, the SMF may send the target DNAI to the AMF for triggering I-SMF (re)selection, e.g. the AMF performs I-SMF (re)selection based on target DNAI.

Clause 4.11.1.3.3 of 3GPP TS 23.502 V17.0.0, the disclosure of which is incorporated by reference herein in its entirety, describes Evolved Packet System (EPS) to fifth generation system (5GS) Mobility Registration Procedure (Idle and Connected State) using N26 interface. According to clause 4.11.1.3.3 of 3GPP TS 23.502 V17.0.0, in the home-routed roaming case and connected state mobility, based on the S-NSSAI value for the Serving PLMN (Public Land Mobile Network) of the PDU Session(s), the AMF decides whether V-SMF change is needed or not. If the V-SMF reallocation is not needed, and if the two values (i.e. the S-NSSAI value configured in AMF for interworking and S-NSSAI value for the Serving PLMN) are different, the AMF invokes Nsmf_PDUSession_UpdateSMContext (PDU Session ID (identifier), S-NSSAI value for the Serving PLMN). The V-SMF updates 5G AN with the new S-NSSAI of VPLMN (visited PLMN) by sending a N2 SM message to 5G AN via AMF. If the V-SMF change is needed, the AMF performs as the case of I-SMF change defined in clause 4.23.4.3 of 3GPP TS 23.502 V17.0.0.

Per clause 4.11.1.3.3 of 3GPP TS 23.502 V17.0.0, V-SMF change may be needed, and same procedure as for I-SMF change in clause 4.23.4.3 of 3GPP TS 23.502 V17.0.0 is assumed. If the V-SMF change is needed, the AMF performs as the case of I-SMF change defined in clause 4.23.4.3 of 3GPP TS 23.502 V17.0.0.

Per clause 4.23.4.3 of 3GPP TS 23.502 V17.0.0, the new I-SMF sends a Nsmf_PDUSession_CreateSMContext Response (N2 SM information (PDU Session ID, QFI(s), QoS profile(s), CN N3 Tunnel Info, S-NSSAI, User Plane Security Enforcement, UE Integrity Protection Maximum Data Rate), N1 SM Container, Cause)) to the AMF. The CN N3 Tunnel Info is the UL Tunnel Info of the new I-UPF.

Mobility registration may be performed in CONNECTED state after EPS to 5GS handover, and in this case, there is already an established N3 tunnel between the NG-RAN and V-UPF. If there is V-SMF change, N3 tunnel entity at CN will be changed to new V-UPF, while the N3 tunnel entity at NG-RAN should remain unchanged, therefore NG-RAN expects PDU Session Resource Modify Request (in N2 SM info) instead of PDU Session Resource Setup Request.

However, in the referenced clause 4.23.4.3 of 3GPP TS 23.502 V17.0.0 for Service Request, at I-SMF change, the new I-SMF will set up the N3 tunnel, therefore the new I-SMF will include PDU Session Resource Setup Request in N2 SM info.

According to I-SMF (V-SMF) change procedure as defined in 3GPP TS 23.502 V17.0.0, the new I-SMF (or V-SMF) doesn't know this reselection is only triggered by AMF without mobility or not, so the new I-SMF (or V-SMF) cannot decide to send N2: PDU session resource setup request message or N2: PDU Session Resource Modify Request to RAN. If the I-SMF (or V-SMF) re-selection is triggered by AMF due to the slice change during 4G (fourth generation network) to 5G (fifth generation network) mobility, the new I-SMF (or V-SMF) cannot get the AN tunnel information from the old I-SMF (or V-SMF), so the N2: PDU Session Resource Modify Request message cannot be correctly compiled. The problem will happen during these two procedures: EPS to 5GS idle mobility with UP (user plane) activation using N26 interface and EPS to 5GS handover using N26 interface.

Therefore, at V-SMF change, procedure for I-SMF change in clause 4.23.4.3 of 3GPP TS 23.502 V17.0.0 cannot be referenced as is, and need modification.

To overcome or mitigate at least one of above mentioned problems or other problems, the embodiments of the present disclosure propose an improved solution for session management function reselection.

In a first aspect of the disclosure, there is provided a method performed by an access and mobility function. The method comprises selecting a second session management function (SMF) to serve a session of a user equipment (UE). The session of the UE is currently served by a first SMF and an access network. The method further comprises sending a create session management context request comprising a reason of selecting the second SMF to serve the session of the UE to the second SMF. The reason indicates that the session of the UE is still served by the access network. The method further comprises receiving a create session management context response comprising a session resource modify request from the second SMF. The session resource modify request comprises access network tunnel information of the access network. The method further comprises sending the session resource modify request to the access network.

In an embodiment, the reason of selecting the second SMF to serve the session of the UE comprises slice change.

In an embodiment, the slice change comprises single-network slice selection assistance information (S-NSSAI) change.

In an embodiment, the session resource modify request is a protocol data unit (PDU) session resource modify request.

In an embodiment, the create session management context request is a Nsmf_PDUSession_CreateSMContext Request and the create session management context response is a Nsmf_PDUSession_CreateSMContext Response.

In an embodiment, the session of the UE comprises a PDU session of the UE.

In an embodiment, the create session management context request is sent after a completion of Evolved Packet System (EPS) to fifth generation system (5GS) Mobility Registration Procedure using N26 interface or EPS to 5GS handover using N26 interface.

In an embodiment, the first SMF comprises a first intermediate SMF and the second SMF comprises a second intermediate SMF.

In an embodiment, the first SMF comprises a first visited SMF and the second SMF comprises a second visited SMF.

In a second aspect of the disclosure, there is provided a method performed by a second session management function (SMF). The method comprises receiving a create session management context request comprising a reason of selecting the second SMF to serve a session of a user equipment (UE) from an access and mobility function. The session of the UE is currently served by a first SMF and an access network. The reason indicates that the session of the UE is still served by the access network. The method further comprises sending a session context request comprising the reason of selecting the second SMF to serve the session of the UE to the first SMF. The method further comprises receiving a session context response comprising the session management context of the session of the UE and tunnel information of the access network from the first SMF. The method further comprises sending a create session management context response comprising a session resource modify request to the access and mobility function. The session resource modify request comprises access network tunnel information of the access network received from the first SMF.

In an embodiment, the create session management context request is received after a completion of Evolved Packet System (EPS) to fifth generation system (5GS) Mobility Registration Procedure using N26 interface or EPS to 5GS handover using N26 interface.

In an embodiment, the session context request is a Nsmf_PDUSession_Context Request and the session context response is a Nsmf_PDUSession_Context Response.

In a third aspect of the disclosure, there is provided an access and mobility function. The access and mobility function comprises a processor and a memory coupled to the processor. Said memory contains instructions executable by said processor. Said access and mobility function is operative to select a second session management function (SMF) to serve a session of a user equipment (UE). The session of the UE is currently served by a first SMF and an access network. Said access and mobility function is further operative to send a create session management context request comprising a reason of selecting the second SMF to serve the session of the UE to the second SMF. The reason indicates that the session of the UE is still served by the access network. Said access and mobility function is further operative to receive a create session management context response comprising a session resource modify request from the second SMF. The session resource modify request comprises access network tunnel information of the access network. Said access and mobility function is further operative to send the session resource modify request to the access network.

In a fourth aspect of the disclosure, there is provided a second session management function (SMF). The second SMF comprises a processor and a memory coupled to the processor. Said memory contains instructions executable by said processor. Said second SMF is operative to receive a create session management context request comprising a reason of selecting the second SMF to serve a session of a user equipment (UE) from an access and mobility function. The session of the UE is currently served by a first SMF and an access network. Said second SMF is further operative to send a session context request comprising the reason of selecting the second SMF to serve the session of the UE to the first SMF. The reason indicates that the session of the UE is still served by the access network. Said second SMF is further operative to receive a session context response comprising the session management context of the session of the UE and tunnel information of the access network from the first SMF. Said second SMF is further operative to send a create session management context response comprising a session resource modify request to the access and mobility function. The session resource modify request comprises access network tunnel information of the access network received from the first SMF.

In a fifth aspect of the disclosure, there is provided an access and mobility function. The access and mobility function comprises a selecting module configured to select a second session management function (SMF) to serve a session of a user equipment (UE). The session of the UE is currently served by a first SMF and an access network. The access and mobility function further comprises a first sending module configured to send a create session management context request comprising a reason of selecting the second SMF to serve the session of the UE to the second SMF. The reason indicates that the session of the UE is still served by the access network. The access and mobility function further comprises a receiving module configured to receive a create session management context response comprising a session resource modify request from the second SMF. The session resource modify request comprises access network tunnel information of the access network. The access and mobility function further comprises a second sending module configured to send the session resource modify request to the access network.

In a sixth aspect of the disclosure, there is provided a second session management function (SMF) according to an embodiment of the disclosure. As shown, the second SMF comprises a first receiving module configured to receive a create session management context request comprising a reason of selecting the second SMF to serve a session of a user equipment (UE) from an access and mobility function. The session of the UE is currently served by a first SMF and an access network. The reason indicates that the session of the UE is still served by the access network. The second SMF further comprises a first sending module configured to send a session context request comprising the reason of selecting the second SMF to serve the session of the UE to the first SMF. The second SMF further comprises a second receiving module configured to receive a session context response comprising the session management context of the session of the UE and tunnel information of the access network from the first SMF. The second SMF further comprises a second sending module configured to send a create session management context response comprising a session resource modify request to the access and mobility function. The session resource modify request comprises access network tunnel information of the access network received from the first SMF.

In a seventh aspect of the disclosure, there is provided a computer program product comprising instructions which when executed by at least one processor, cause the at least one processor to perform the method according to any one of the first and second aspects.

In an eighth aspect of the disclosure, there is provided a computer-readable storage medium storing instructions which when executed by at least one processor, cause the at least one processor to perform the method according to any one of the first and second aspects.

Embodiments herein may provide many advantages, of which a non-exhaustive list of examples follows. In some embodiments herein, the proposed solution can enable a new I-SMF (or V-SMF) to know the I-SMF (or V-SMF) reselection is only triggered by AMF without mobility, so I-SMF (or V-SMF) decide to send N2: PDU Session Resource Modify Request to RAN. In some embodiments herein, the proposed solution can enable the new I-SMF (or V-SMF) to get the AN Tunnel information from old I-SMF (or V-SMF), so the N2: PDU Session Resource Modify Request message cannot be correctly compiled. In some embodiments herein, the proposed solution can save the mobility time since the proposed method are performed after the mobility has completed. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

DETAILED DESCRIPTION

Figure 1:
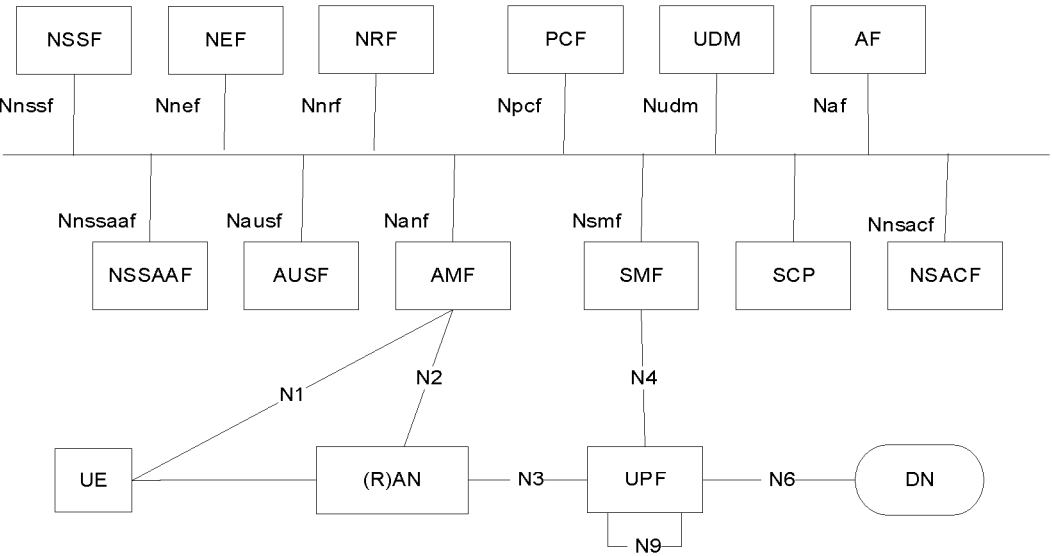
FIG. 1 schematically shows a high level architecture in the fifth generation network according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IOT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 2:
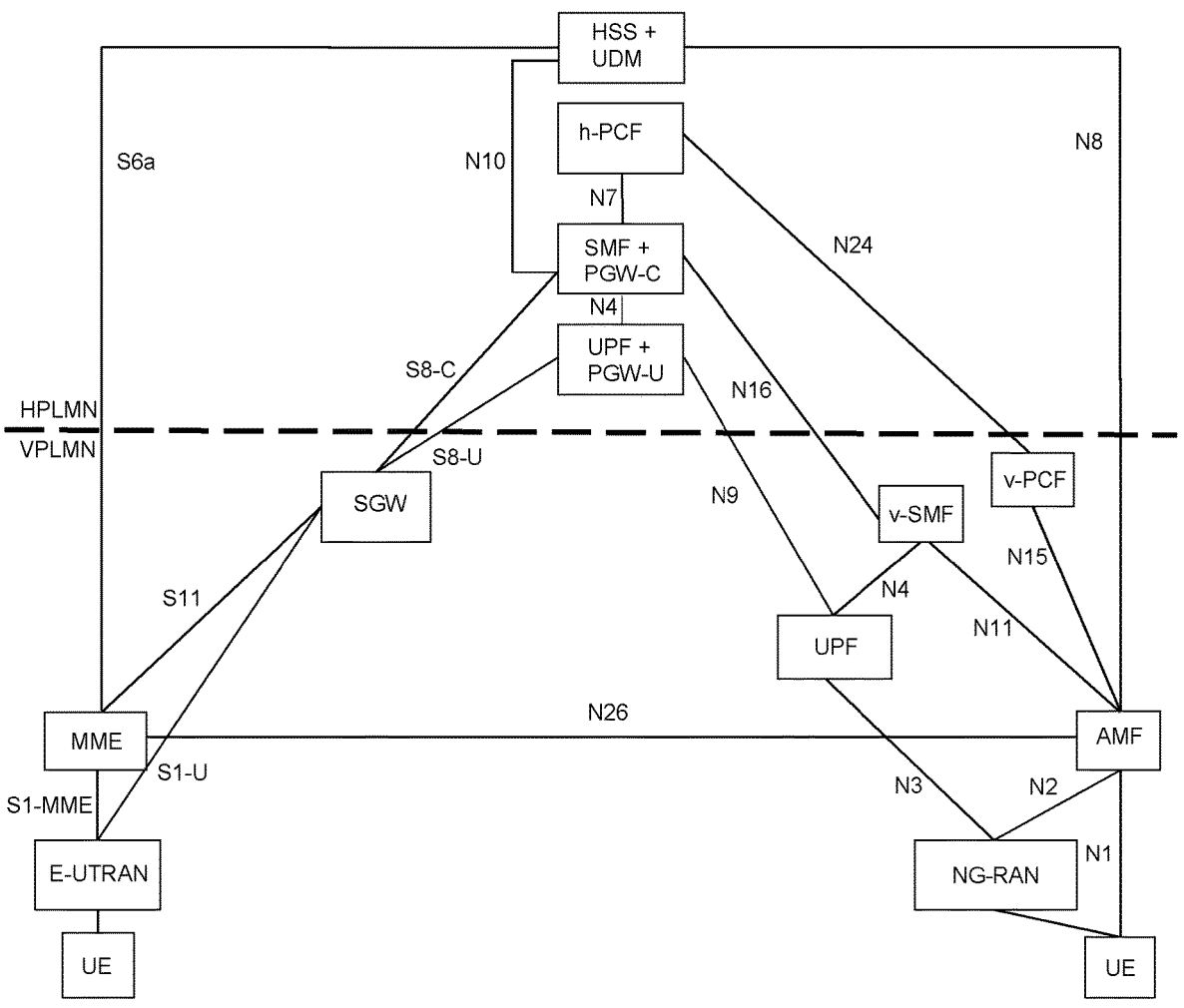
FIG. 2 schematically shows home-routed roaming architecture for interworking between 5GS and EPC/E-UTRAN.

Although the subject matter described herein may be implemented in any appropriate type of system using any suitable components, the embodiments disclosed herein are described in relation to a communication system complied with the exemplary system architectures illustrated in FIGS. 1-2. For simplicity, the system architectures of FIGS. 1-2 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture in the fifth generation network according to an embodiment of the present disclosure. For example, the fifth generation network may be 5GS. The architecture of FIG. 1 is same as FIG. 4.2.3-1 as described in 3GPP TS 23.501 V17.0.0, the disclosure of which is incorporated by reference herein in its entirety. The system architecture of FIG. 1 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), NSACF (Network Slice Admission Control Function), etc.

In accordance with an exemplary embodiment, the UE can establish a signaling connection with the AMF over the reference point N1, as illustrated in FIG. 1. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1, the exemplary system architecture also contains the service-based interfaces such as Nnrf, Nnef, Nausf, Nudm, Npcf, Namf, Nnsacf and Nsmf exhibited by NFs such as the NRF, the NEF, the AUSF, the UDM, the PCF, the AMF, the NSACF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, security, etc. The AUSF, AMF, DN, NEF, NRF, NSSF, PCF, SMF, UDM, UPF, AF, UE, (R)AN, SCP, NSACF may include the functionality for example as defined in clause 6.2 of 3GPP TS 23.501 V17.0.0.

FIG. 2 schematically shows home-routed roaming architecture for interworking between 5GS and EPC (Evolved Packet Core)/E-UTRAN (Evolved Universal Terrestrial Radio Access Network), which is the same as FIG. 4.3.2-2 of 3GPP TS 23.501 V17.0.0. The system architecture of FIG. 2 may comprise some exemplary elements such as HSS (Home Subscriber Server)+UDM (HSS combined with UDM), h-PCF (home PCF), SMF+PGW-C(SMF combined with PGW-C), UPF+PGW-U (PGW user plane) (UPF combined with PGW-U), SGW, v-SMF (visited SMF), v-PCF (visited PCF), UPF, MME, AMF, E-UTRAN, NG-RAN, UE, etc. The network elements and interfaces as shown in FIG. 2 may be same as the corresponding network elements and interfaces as described in 3GPP TS 23.501 V17.0.0.

FIG. 3 shows a flowchart of a method according to an embodiment of the present disclosure, which may be performed by an apparatus implemented in or at or as an access and mobility function or communicatively coupled to the access and mobility function. As such, the apparatus may provide means or modules for accomplishing various parts of the method 300 as well as means or modules for accomplishing other processes in conjunction with other components. The access and mobility function may be any suitable network device or node or entity or function which can provide access function and mobility function. For example, the access and mobility function may be AMF of 5GC.

At block 302, the access and mobility function may select a second session management function (SMF) to serve a session of a user equipment (UE). The session of the UE is currently served by a first SMF and an access network. In an embodiment, the first and second session management functions may be SMF of 5GC.

The access and mobility function may select a second SMF to serve a session of the UE due to various reasons such as slice change. For example, as described in Clause 4.11.1.3.3 of 3GPP TS 23.502 V17.0.0, the two values (i.e. the S-NSSAI value configured in AMF for interworking and S-NSSAI value for the Serving PLMN) may be different, therefore the V-SMF change may be needed and the AMF may perform V-SMF reselection.

The slice change may be happen due to various reasons. In an embodiment, in 5GS, the procedure of EPS to 5GS idle mobility with UP (user plane) activation using N26 interface and the procedure of EPS to 5GS handover using N26 interface may result in slice change.

At block 304, the access and mobility function may send a create session management context request comprising a reason of selecting the second SMF to serve the session of the UE to the second SMF. The reason indicates that the session of the UE is still served by the access network. The reason of selecting the second SMF to serve the session of the UE may be represented in various forms such as an indicator, a bit, a bitmap, etc.

In an embodiment, the reason of selecting the second SMF to serve the session of the UE comprises slice change. In other embodiments, the reason of selecting the second SMF to serve the session of the UE may comprise other reasons for example indicating that the session of the UE is still served by the access network when the session of the UE is served by the second SMF.

In an embodiment, the slice change comprises single-network slice selection assistance information (S-NSSAI) change.

In an embodiment, the reason of selecting the second SMF to serve the session of the UE indicates that the session of the UE is still served by the access network when the session of the UE is served by the second SMF.

At block 306, the access and mobility function may receive a create session management context response comprising a session resource modify request from the second SMF. The session resource modify request comprises access network tunnel information of the access network.

At block 308, the access and mobility function may send the session resource modify request to the access network.

In an embodiment, the session resource modify request is a protocol data unit (PDU) session resource modify request for example as described in 3GPP TS 38.413 V16.5.0.

In an embodiment, the create session management context request is a Nsmf_PDUSession_CreateSMContext Request and the create session management context response is a Nsmf_PDUSession_CreateSMContext Response.

In an embodiment, the session of the UE comprises a PDU session of the UE.

In an embodiment, the create session management context request is sent after a completion of Evolved Packet System (EPS) to fifth generation system (5GS) Mobility Registration Procedure using N26 interface or EPS to 5GS handover using N26 interface as described in 3GPP TS 23.502 V17.0.0. In other words the method 300 is performed after Evolved Packet System (EPS) to fifth generation system (5GS) Mobility Registration Procedure using N26 interface or EPS to 5GS handover using N26 interface.

In an embodiment, the first SMF comprises a first intermediate SMF and the second SMF comprises a second intermediate SMF.

In an embodiment, the first SMF comprises a first visited SMF and the second SMF comprises a second visited SMF.

FIG. 4 shows a flowchart of a method according to another embodiment of the present disclosure, which may be performed by an apparatus implemented in or at or as a second session management function (SMF) or communicatively coupled to the second SMF. As such, the apparatus may provide means or modules for accomplishing various parts of the method 400 as well as means or modules for accomplishing other processes in conjunction with other components. The second SMF may be any suitable network device or node or entity or function which can provide session management function. For example, the second SMF may be I-SMF or V-SMF of 5GC. For some parts which have been described in the above embodiments, the description thereof is omitted here for brevity.

At block 402, the second SMF may receive a create session management context request comprising a reason of selecting the second SMF to serve a session of a user equipment (UE) from an access and mobility function. The session of the UE is currently served by a first SMF and an access network. The reason indicates that the session of the UE is still served by the access network. For example, the access and mobility function may send a create session management context request comprising a reason of selecting the second SMF to serve the session of the UE to the second SMF at block 304 of FIG. 3, and then the second SMF may receive the create session management context request. For example, when the second SMF receives a create session management context request comprising a reason of selecting the second SMF to serve a session of a user equipment (UE) from an access and mobility function, the second SMF knows that the session of the UE is still served by the access network when the session of the UE is served by the second SMF. In other words, the access network is not changed when the session of the UE is served by the second SMF. The second SMF may need to retrieve tunnel information of the access network from the first SMF.

At block 404, the second SMF may send a session context request comprising the reason of selecting the second SMF to serve the session of the UE to the first SMF. The reason of selecting the second SMF to serve the session of the UE may let the first SMF know that the session of the UE is still served by the access network when the session of the UE is served by the second SMF, therefore the first SMF may send the tunnel information of the access network to the second SMF if the first SMF has the tunnel information of the access network.

At block 406, the second SMF may receive a session context response comprising the session management context of the session of the UE and tunnel information of the access network from the first SMF.

At block 408, the second SMF may send a create session management context response comprising a session resource modify request to the access and mobility function. The session resource modify request comprises access network tunnel information of the access network received from the first SMF. For example based on the reason of selecting the second SMF to serve a session of a user equipment (UE), the second SMF knows that the session of the UE is still served by the access network when the session of the UE is served by the second SMF, therefore a session resource modify request rather than session resource setup request may be sent to the access and mobility function which may send the session resource modify request to the access network.

In an embodiment, the create session management context request is received after a completion of Evolved Packet System (EPS) to fifth generation system (5GS) Mobility Registration Procedure using N26 interface or EPS to 5GS handover using N26 interface. In other words, the method 400 may be performed after Evolved Packet System (EPS) to fifth generation system (5GS) Mobility Registration Procedure using N26 interface or EPS to 5GS handover using N26 interface.

In an embodiment, the session context request is a Nsmf_PDUSession_Context Request and the session context response is a Nsmf_PDUSession_Context Response.

FIG. 5 shows a flowchart of a method according to another embodiment of the present disclosure, which may be performed by an apparatus implemented in or at or as a first session management function (SMF) or communicatively coupled to the first SMF. As such, the apparatus may provide means or modules for accomplishing various parts of the method 500 as well as means or modules for accomplishing other processes in conjunction with other components. The first SMF may be any suitable network device or node or entity or function which can provide session management function. For example, the first SMF may be I-SMF or V-SMF of 5GC. For some parts which have been described in the above embodiments, the description thereof is omitted here for brevity.

At block 502, the first SMF may receive a session context request comprising a reason of selecting a second SMF to serve a session of a user equipment (UE) from a second SMF. The session of the UE is currently served by the first SMF and an access network. For example, the second SMF may send a session context request comprising the reason of selecting the second SMF to serve the session of the UE to the first SMF at block 404 of FIG. 4, and then the first SMF may receive the session context request.

At block 504, the first SMF may send a session context response comprising the session management context of the session of the UE and tunnel information of the access network to the second SMF.

In an embodiment, the session context request is received after a completion of Evolved Packet System (EPS) to fifth generation system (5GS) Mobility Registration Procedure using N26 interface or EPS to 5GS handover using N26 interface. In other words, the method 500 may be performed after Evolved Packet System (EPS) to fifth generation system (5GS) Mobility Registration Procedure using N26 interface or EPS to 5GS handover using N26 interface.

Figure 6:
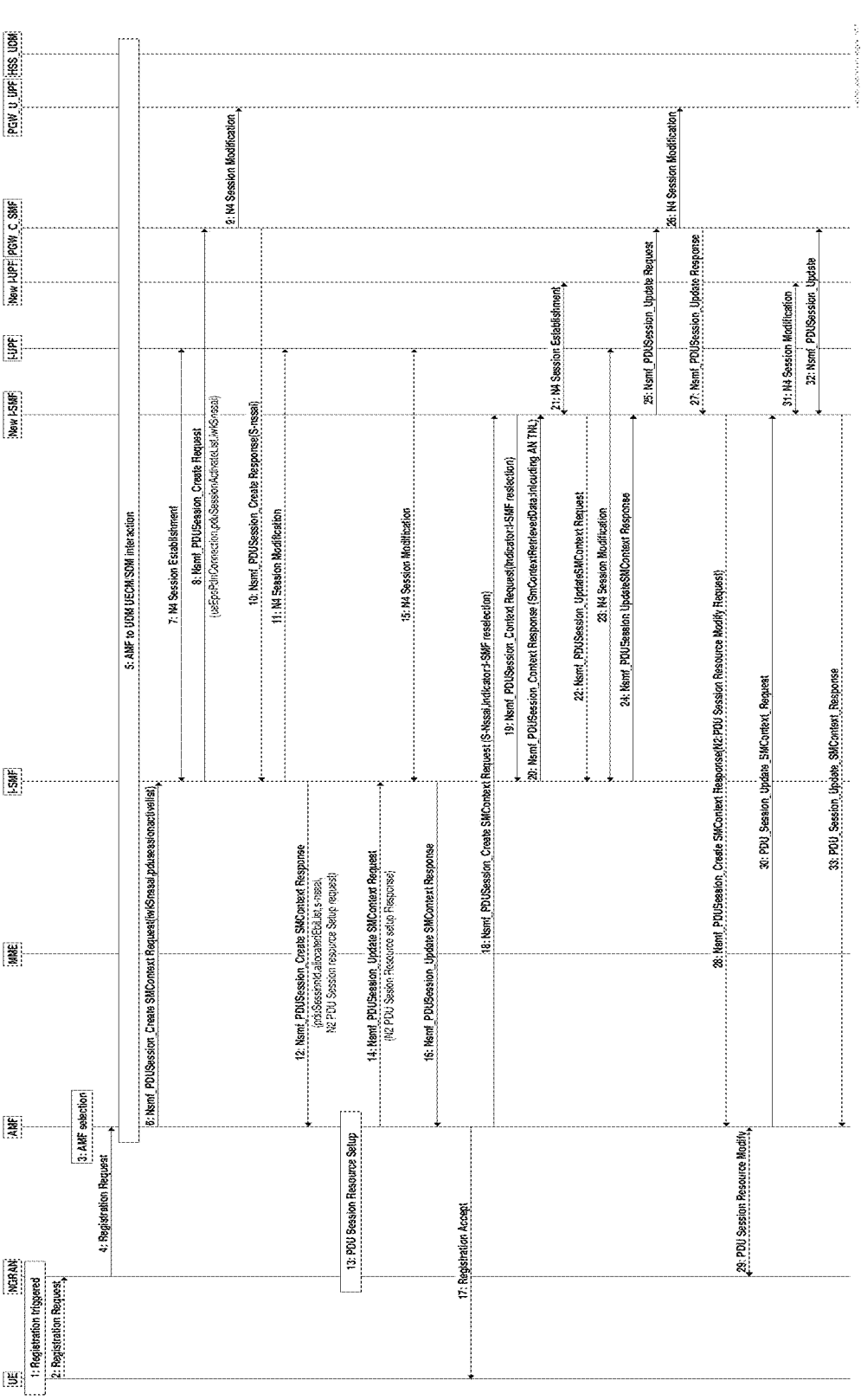
FIG. 6 shows a flowchart of a method according to another embodiment of the present disclosure.

FIG. 6 shows a flowchart of a method according to another embodiment of the present disclosure. For some parts which have been described in the above embodiments, the description thereof is omitted here for brevity.

At step 1, registration is triggered.

At step 2, UE sends a registration request to NGRAN (next generation RAN).

At step 3, AMF selection is performed.

At step 4, NGRAN sends Registration Request to AMF.

At step 5, UDM UECM (UE context Management)/SDM (Subscriber Data Management) interaction.

At step 6, AMF sends Nsmf_PDUSession_CreateSM-Context Request(iwkSnssai, PDU session active list) I-SMF. AMF may select I-SMF according to iwkSnssai. "iwkSnssai" denotes the S-NSSAI value configured in AMF for interworking.

At step 7, I-SMF sends N4 Session Establishment to I-UPF and receives N4 Session Establishment Response from the I-UPF.

At step 8, I-SMF sends Nsmf_PDUSession_Create Request (ueEpsPdnConnection, pduSessionActivat-eList, iwkSnssai) to PGW_C_SMF (PGW-C combined with SMF).

At step 9, PGW_C_SMF sends N4 Session Modification to PGW_U_UPF (PGW-U combined with UPF).

At step 10, PGW_C_SMF sends Nsmf_PDUSession-_Create Response (S-NSSAI) to I-SMF.

At step 11, I-SMF sends N4 Session Modification to I-UPF.

At step 12, I-SMF sends Nsmf_PDUSession_CreateSM-Context Response (pduSessionId, allocated EbiList, s-nssai, N2 PDU Session resource Setup request) to AMF.

At step 13, NGRAN sends PDU Session Resource Setup to AMF.

At step 14, AMF sends Nsmf_PDUSession_Update SMContext Request (N2 PDU Session Resource setup Response) to I_SMF.

At step 15, I-SMF sends N4 Session Modification request to I_UPF.

At step 16, I_SMF sends Nsmf_PDUSession_Update SMContext Response to AMF.

At step 17, AMF sends Registration Accept to UE.

Step 1~Step 17 are the standard behavior for 4G to 5G idle mobility for example as described in 3GPP TS 23.501 V17.0.0 and 3GPP TS 23.502 V17.0.0.

At step 18, AMF selects I-SMF according to changed S-Nssai and sends Nsmf_PDUSession_CreateSMContext Request (S-NSSAI, indicator: I-SMF reselection) to New I-SMF. For example, the indicator may indicate I-SMF reselection due to SNSSAI change.

For example AMF may re-select the new I-SMF(V-SMF) during 4G to 5G mobility when getting the real slice information from A-SMF (anchor SMF, e.g., PGW_C_SMF). AMF continues to do current 4G to 5G mobility. After the mobility has done, AMF triggers I-SMF change procedure, sends Nsmf_PDUSessin_CreateSMContext Request to new I-SMF(V-SMF) with one new indicator: I-SMF(V-SMF) reselection due to SNSSAI change. That means the AN tunnel is not change.

At step 19, New I_SMF sends Nsmf_PDUSession_Context Request(Indicator: I-SMF reselection) to I_SMF. New I-SMF forwards this new indicator to old I-SMF when retrieve session context data.

For example, the New I-SMF forwards this new indicator to old I-SMF(V-SMF), and old I-SMF(V-SMF) will send this AN Tunnel information in SmContextRetrivedData to New I-SMF if it has, and the new I-SMF will decide to send N2: PDU Session Resource Modify Request with this AN TNL to RAN instead of PDU Session Resource Setup Request.

At step 20, I_SMF sends Nsmf_PDUSession_Context Response (SmContextRetrievedData:inlcuding AN TNL) to new I-SMF. TNL denotes tunnel. For example the old I-SMF sends AN tunnel to New I-SMF if it has.

At step 21, N4 Session Establishment between new I_SMF and new_I_UPF.

At step 22, New I_SMF sends Nsmf_PDUSession_UpdateSMContext Request to I-SMF.

At step 23, N4 Session Modification between I-SMF and I-UPF.

At step 24, I_SMF sends Nsmf_PDUSession UpdateSMContext Response to New I-SMF.

At step 25, New I-SMF sends Nsmf_PDUSession_Update Request to PGW_C_SMF.

At step 26, PGW_C_SMF sends N4 Session Modification to PGW_U_UPF.

At step 27, PGW_C_SMF sends Nsmf_PDUSession_Update Response to New I-SMF.

At step 28, New I_SMF sends Nsmf_PDUSession_CreateSMContext Response (N2:PDU Session Resource Modify Request) to AMF. for example, New I-SMF decides to send PDU Session Resource Modify instead of PDU Session Resource Setup.

At step 29, PDU Session Resource Modify is performed between AMF and NGRAN.

At step 30, AMF sends PDU_Session_Update_SMContext_Request to New I-SMF.

At step 31, N4 Session Modification is performed between New I-SMF and New I-UPF.

At step 32, Nsmf_PDUSession_Update is performed between New I-SMF and PGW C_SMF.

At step 33, New I-SMF sends PDU_Session_Update_SMContext_Response to AMF.

Figure 7:
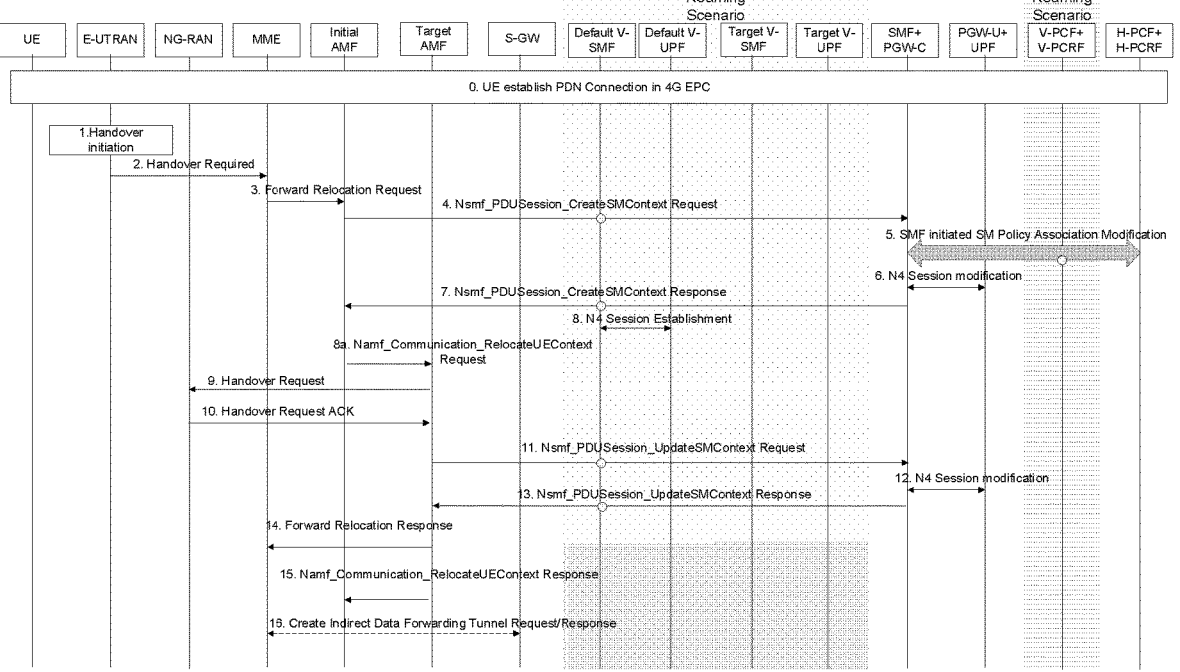
FIG. 7 shows a flowchart of a method according to another embodiment of the present disclosure.

FIG. 7 shows a flowchart of a method according to another embodiment of the present disclosure FIG. 7 is same as FIG. 4.11.1.2.2.2-1 of 3GPP TS 23.502 V17.0.0. For some parts which have been described in the above embodiments, the description thereof is omitted here for brevity.

In Step 7, AMF gets the real Snssai which is different as the default iwkSnssai used in step 4. But AMF continues to complete the handover procedure with the default slice as FIG. 8.

The other steps are described in clause 4.11.1.2.2.2 of 3GPP TS 23.502 V17.0.0, the description thereof is omitted here for brevity.

Figure 8:
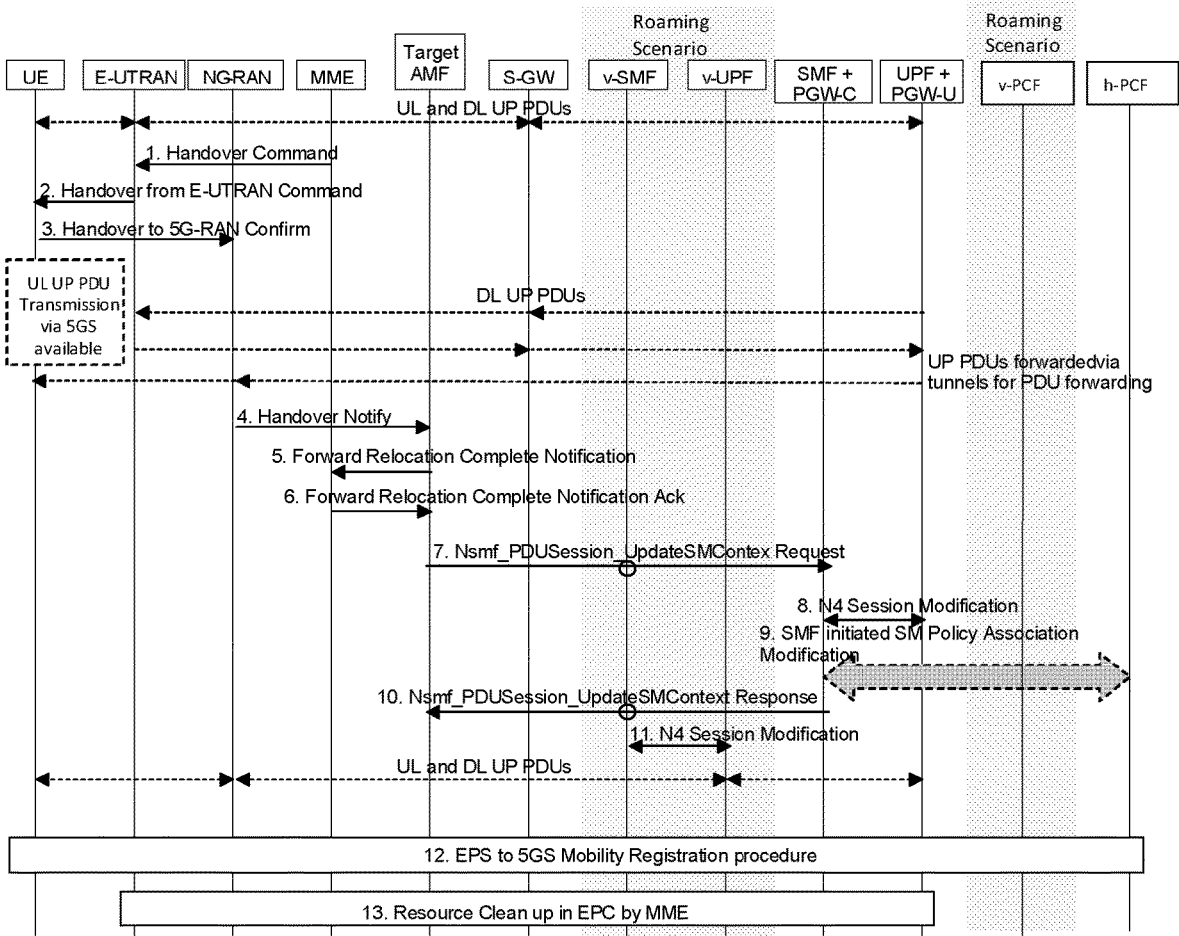
FIG. 8 shows a flowchart of a method according to another embodiment of the present disclosure.

FIG. 8 shows a flowchart of a method according to another embodiment of the present disclosure. FIG. 8 is same as FIG. 4.11.1.2.2.3-1 of 3GPP TS 23.502 V17.0.0. For some parts which have been described in the above embodiments, the description thereof is omitted here for brevity. The steps are described in clause 4.11.1.2.2.3 of 3GPP TS 23.502 V17.0.0, the description thereof is omitted here for brevity.

After the handover is finished, the AMF triggers I-SMF reselection procedure and send one new indicator: I-SMF (V-SMF) reselection due to S-NSSAI change, then New I-SMF sends it to old I-SMF, then old I-SMF returns the AN TNL to New I-SMF if it has, so New I-SMF decides to send N1: PDU Session Resource Modify Request instead of PDU Session Resource setup request to RAN.

Figure 9:
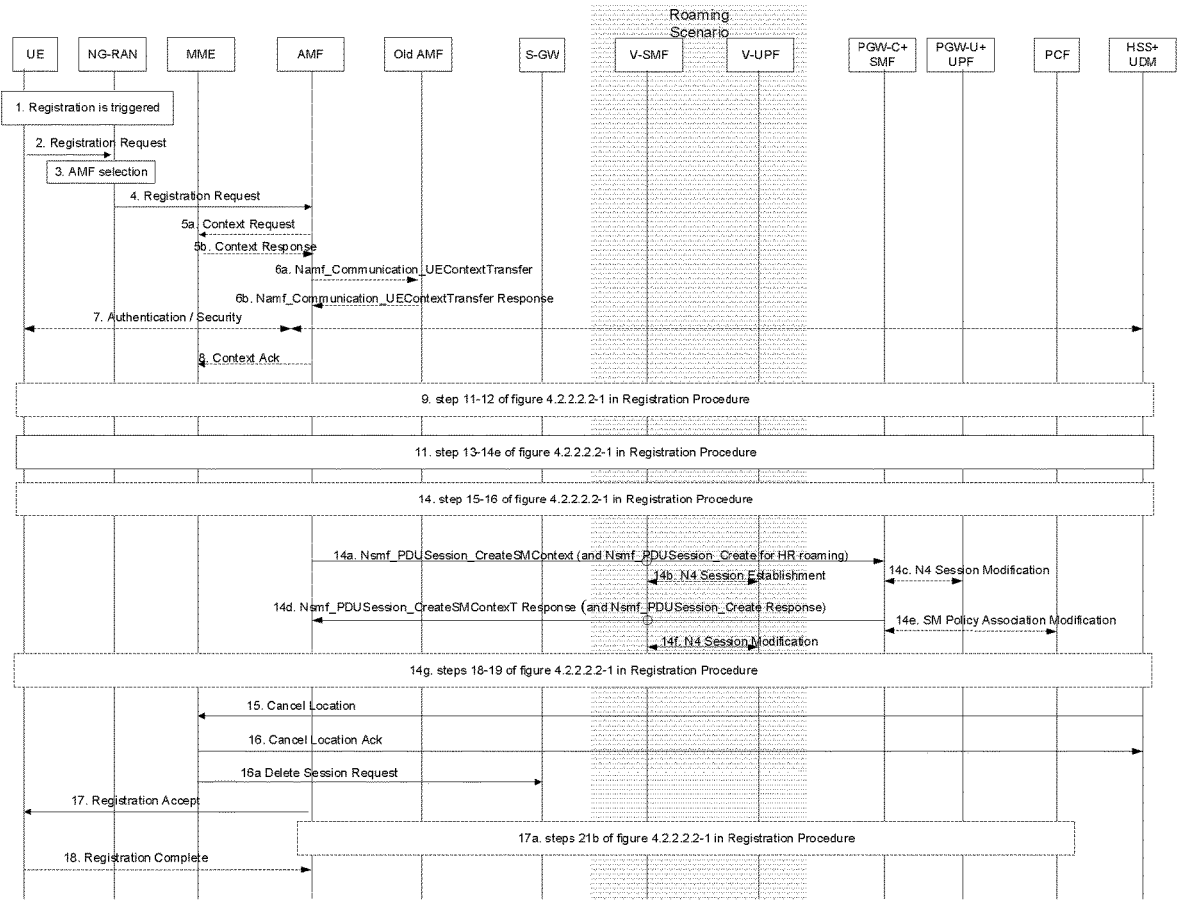
FIG. 9 shows a flowchart of EPS to 5GS Mobility Registration Procedure (Idle and Connected State) using N26 interface according to another embodiment of the present disclosure.

FIG. 9 shows a flowchart of EPS to 5GS Mobility Registration Procedure (Idle and Connected State) using N26 interface according to another embodiment of the present disclosure. FIG. 9 is same as FIG. 4.11.1.3.3-1 of 3GPP TS 23.502 V17.0.0.

At steps 14-14*f*. Step 16 of clause 4.2.2.2.2 (AM Policy Association Establishment) of 3GPP TS 23.502 V17.0.0 is optionally performed.

In the home-routed roaming case and connected state mobility, based on the S-NSSAI value for the Serving PLMN of the PDU Session(s), the AMF decides whether V-SMF change is needed or not. If the V-SMF reallocation is not needed, and if the two values (i.e. the S-NSSAI value configured in AMF for interworking and S-NSSAI value for the Serving PLMN) are different, the AMF invokes Nsmf_P-DUSession_UpdateSMContext (PDU Session ID, S-NSSAI value for the Serving PLMN). The V-SMF updates 5G AN with the new S-NSSAI of VPLMN by sending a N2 SM message to 5G AN via AMF. If the V-SMF change is needed, the AMF performs as the case of I-SMF change defined in clause 4.23.4.3 of 3GPP TS 23.502 V17.0.0 with the following modification:

In step 3 of clause 4.23.4.3 of 3GPP TS 23.502 V17.0.0, the AMF indicates to the new V-SMF that the new V-SMF is selected due to slice change.

In step 4a of clause 4.23.4.3 of 3GPP TS 23.502 V17.0.0, when the new V-SMF retrieves SM context from the old V-SMF, the new V-SMF pass the indication received in step 3 of clause 4.23.4.3 to the old V-SMF.

In step 4b of clause 4.23.4.3 of 3GPP TS 23.502 V17.0.0, the old V-SMF returns also the tunnel information of NG-RAN.

In step 9 of clause 4.23.4.3 of 3GPP TS 23.502 V17.0.0, when the new V-SMF sends a Nsmf_PDUSession_CreateSMContext Response, the new V-SMF includes PDU Session Resource Modify in N2 SM information.

In the home-routed roaming case and idle state mobility, the AMF selects a default V-SMF per PDU Session and invokes Nsmf_PDUSession_CreateSMContext service operation of the V-SMF to create an association with the AMF. It includes UE EPS PDN Connection, H-SMF ID, S-NSSAI and indicates all the PDU Session(s) to be re-activated as received in the Registration request message along with List Of PDU Sessions To Be Activated. The S-NSSAI is the S-NSSAI configured in AMF for interworking, which is associated with default V-SMF. The V-SMF creates the association and based on the received SMF ID, the V-SMF invokes Nsmf_PDUSession_Create request service operation of the H-SMF and provides the information received from the AMF. Before invoking PDUSession_Create service operation, the V-SMF request the V-UPF to provide the CN tunnel info. The subsequent handling is performed as follows:

The H-SMF finds the corresponding PDU Session based on the PDN Connection Context in the request. The H-SMF initiates N4 Session modification procedure to establish the CN tunnel for the PDU Session. The tunnel info for PDU Session is allocated by PGW-U+ UPF and provided to the SMF+PGW-C. The H-SMF responds V-SMF with the PDU Session ID corresponding to the PDN Connection Context in the request, the allocated EBI(s) information, the S-NSSAI of the PDU Session, S-NSSAI of HPLMN, UE EPS PDN connection(s), and other PDU session parameters, such as PDU Session Type, Session AMBR in the Nsmf_PDUSession_Create response.

The V-SMF updates its SM contexts and returns a Nsmf PDU_Session_CreateSMContextResponse message including the information received from the H-SMF. The V-SMF updates the V-UPF of the CN tunnel info of SMF+PGW-C. The V-SMF also includes the N2 SM Context in the response message sent to the AMF if the corresponding PDU Session is in the received List Of PDU Sessions To Be Activated. The V-SMF stores an association of the PDU Session ID and the H-SMF ID. The AMF stores the V-SMF ID and it also stores S-NSSAI and the allocated EBI(s) associated to the PDU Session ID. Based on the S-NSSAI value for the Serving PLMN of the PDU Session(s) the AMF decides whether V-SMF relocation is needed or not. If V-SMF relocation is not needed, and if the two values (i.e. the S-NSSAI value configured in AMF for interworking and S-NSSAI value for the Serving PLMN) are different, the AMF sends the S-NSSAI value for the Serving PLMN to V-SMF by invoking Nsmf_PDUSession_UpdateSMContext service operation. The V-SMF updates NG RAN with the S-NSSAI value for the Serving PLMN via N2 SM message. If V-SMF relocation is needed, the AMF performs V-SMF relocation as defined in clause 4.23.4.3 of 3GPP TS 23.502 V17.0.0.

In non-roaming and LBO cases and idle state mobility, AMF invokes Nsmf_PDUSession_CreateSMContext Request (UE EPS PDN Connection) service operation of the SMF+PGW-C and indicates all the PDU Session(s) to be re-activated as received in the Registration request message along with List Of PDU Sessions To Be Activated. This step is performed for each PDN Connection and the corresponding SMF+PGW-C address/ID in the UE context the AMF received in Step 6.

If the P-GW-C+SMF (H-SMF in the case of home-routed roaming case) determines that seamless session continuity from EPS to 5GS is not supported for the PDU Session, then it does not provide SM information for the corresponding PDU Session but includes the appropriate cause code for rejecting the PDU Session transfer within the N2 SM Information. The SMF+PGW-C finds the corresponding PDU Session based on the PDN Connection Context in the request. The SMF+PGW-C initiates N4 Session modification procedure to establish the CN tunnel for the PDU Session, and for Idle state mobility registration, releases the resource of the CN tunnels for EPS bearers corresponding to the PDU session as well. If the SMF+PGW-C has not yet registered for this PDU Session ID, the SMF+PGW-C registers with the UDM using Nudm_UECM_Registration (SUPI, DNN, PDU Session ID) for a given PDU Session as in step 4 of PDU Session Establishment Procedure in clause 4.3.2. The tunnel info for PDU Session is allocated by PGW-U+UPF and provided to the SMF+PGW-C. The SMF+PGW-C updates its SM contexts and returns the AMF a Nsmf_PDUSession_CreateSMContext Response message including the PDU Session ID corresponding to the PDN Connection Context in the request, the allocated EBI(s) information, the S-NSSAI of the PDU Session, and the N2 SM Context if the corresponding PDU Session is in the received List Of PDU Sessions To Be Activated. The AMF stores an association of the PDU Session ID and the SMF ID, S-NSSAI, and the allocated EBI(s) associated to the PDU Session ID. Based on the allocated EBI(s) information received from all the related SMF+PGW-C for this UE, an EPS bearer status, which reflects all existing EPS bearer, is generated by the AMF.

> NOTE 3: For Connected State mobility registration, the release of CN tunnels for EPS bearers and UDM registration for the session corresponding to the PDU session is performed in the handover execution phase.

If the PDN Type of a PDN Connection in EPS is non-IP, and it was originally established as Ethernet PDU Session when UE was camping in 5GS (known based on local context information that was set to PDU Session Type Ethernet in UE and SMF), the PDU Session Type in 5GS shall be set to Ethernet by the SMF and UE. If the PDN type of a PDN Connection in EPS is non-IP, and is locally associated in UE and SMF to PDU Session Type Unstructured, the PDU Session Type in 5GS shall be set to Unstructured by the SMF and UE.

> NOTE 4: If the non-IP PDN Type is originally established as Ethernet PDU Session, it means that Ethernet PDN Type is not supported in EPS.

If the AMF has received the EPS Bearer Status in the Registration Request from UE, the AMF shall send the EPS Bearer Status to all corresponding SMF+PGW-Cs. If the SMF+PGW-C receives the EPS Bearer Status from AMF, the SMF+PGW-C shall check whether the EPS bearer(s) has been deleted by UE but not notified to network. If yes, the SMF+PGW-C shall release those EPS bearer(s), the corresponding 5G QOS Rule(s) and the QoS Flow level QoS parameters locally.

If the SCEF+NEF ID is provided to the SMF, the SMF establishes the SMF-NEF connection as described in steps 2-3 from clause 4.25.2, the SMF provides the SCEF+NEF ID, EBI, APN, User Identity to the SCEF+NEF, and the SCEF+NEF updates the SM contexts and returns the NEF ID, PDU Session ID, DNN and User Identity to the SMF.

If the UE is performing Inter-RAT mobility to or from NB-IOT, the (H-)SMF will maintain, reconnect, release or leave PDU Session handling to the local VPLMN policy in the case of roaming for each PDU session according to the "PDU Session continuity at inter RAT mobility" subscription information. If the (H-)SMF does not have "PDU Session continuity at inter RAT mobility" for a PDU session, the (H-)SMF retrieves it from the UDM before determining any action. The SMF may use local policy to determine the handling a PDU Session if "PDU Session continuity at inter RAT mobility" cannot be retrieved from the UDM.

The other steps are same as the corresponding steps of FIG. 4.11.1.3.3-1 of 3GPP TS 23.502 V17.0.0 and the description thereof is can be found in 4.11.1.3.3 of 3GPP TS 23.502 V17.0.0.

According to various embodiments, there is provided a solution to solve the problem as described above. Follows up with standard 4G to 5G mobility and finishes the mobility at first (to save the mobility timer), then AMF triggers I-SMF (V-SMF) change procedure but AMF sends one indicated to new I-SMF (V-SMF) that it is only triggered by AMF to reselect New I-SMF based on the slice change, no RAN TNL is changed. New I-SMF (V-SMF) sends this indicator to old I-SMF (V-SMF) when getting SM context from the old I-SMF, so old I-SMF can send current AN TNL information to New I-SMF (V-SMF), and New I-SMF can decide to send N2: PDU SESSION RESOURCE MODIFY REQUEST to RAN.

According to various embodiments, at V-SMF change, AMF indicates to the new V-SMF that the V-SMF change is due to slice change. The new V-SMF provides such indication to the old V-SMF so that the old V-SMF send the current NG-RAN tunnel information N3 tunnel information to the new V-SMF. The new V-SMF then initiates PDU Session Resource Modify Request to NG-RAN.

Embodiments herein may provide many advantages, of which a non-exhaustive list of examples follows. In some embodiments herein, the proposed solution can enable a new I-SMF (or V-SMF) to know the I-SMF (or V-SMF) reselection is only triggered by AMF without mobility, so I-SMF (or V-SMF) decide to send N2: PDU Session Resource Modify Request to RAN. In some embodiments herein, the proposed solution can enable the new I-SMF (or V-SMF) to get the AN Tunnel information from old I-SMF (or V-SMF), so the N2: PDU Session Resource Modify Request message cannot be correctly compiled. In some embodiments herein, the proposed solution can save the mobility time since the proposed method are performed after the mobility has completed. The embodiments herein are not limited to the features and advantages mentioned above. A person skilled in the art will recognize additional features and advantages upon reading the following detailed description.

Figure 10:
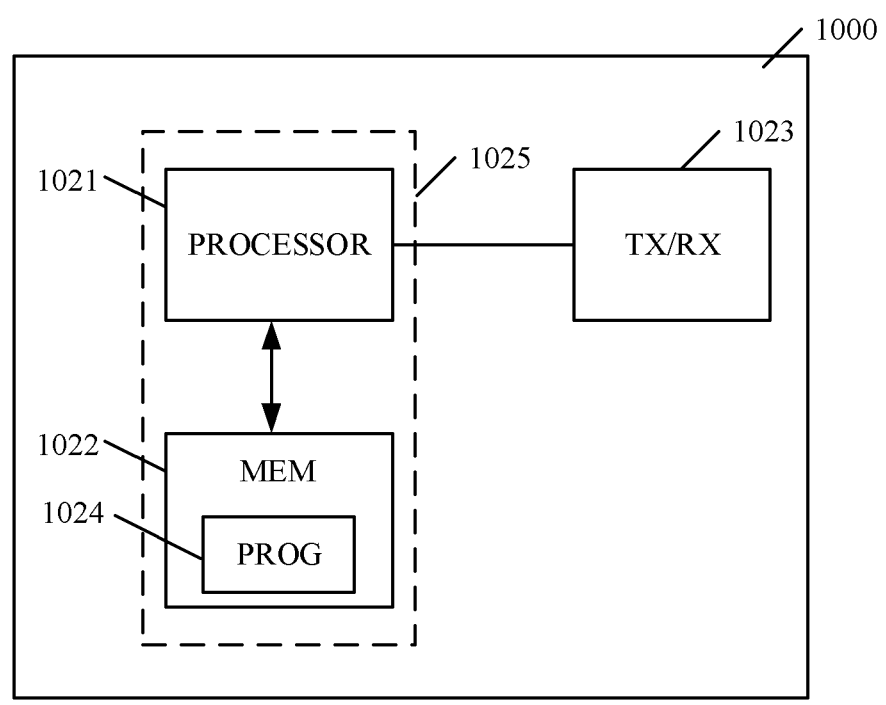
FIG. 10 is a block diagram showing an apparatus suitable for practicing some embodiments of the disclosure.

FIG. 10 is a block diagram showing an apparatus suitable for practicing some embodiments of the disclosure. For example, any one of the access and mobility function, the first SMF or the second SMF described above may be implemented as or through the apparatus 1000.

The apparatus 1000 comprises at least one processor 1021, such as a digital processor (DP), and at least one memory (MEM) 1022 coupled to the processor 1021. The apparatus 1000 may further comprise a transmitter TX and receiver RX 1023 coupled to the processor 1021. The MEM 1022 stores a program (PROG) 1024. The PROG 1024 may include instructions that, when executed on the associated processor 1021, enable the apparatus 1000 to operate in accordance with the embodiments of the present disclosure. A combination of the at least one processor 1021 and the at least one MEM 1022 may form processing means 1025 adapted to implement various embodiments of the present disclosure.

Various embodiments of the present disclosure may be implemented by computer program executable by one or more of the processor 1021, software, firmware, hardware or in a combination thereof.

The MEM 1022 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1021 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the access and mobility function, the memory 1022 contains instructions executable by the processor 1021, whereby the access and mobility function operates according to any of the methods related to the access and mobility function as described above.

In an embodiment where the apparatus is implemented as or at the first SMF, the memory 1022 contains instructions executable by the processor 1021, whereby the first SMF operates according to any of the methods related to the first SMF as described above.

In an embodiment where the apparatus is implemented as or at the second SMF, the memory 1022 contains instructions executable by the processor 1021, whereby the second SMF operates according to any of the methods related to the second SMF as described above.

Figure 11:
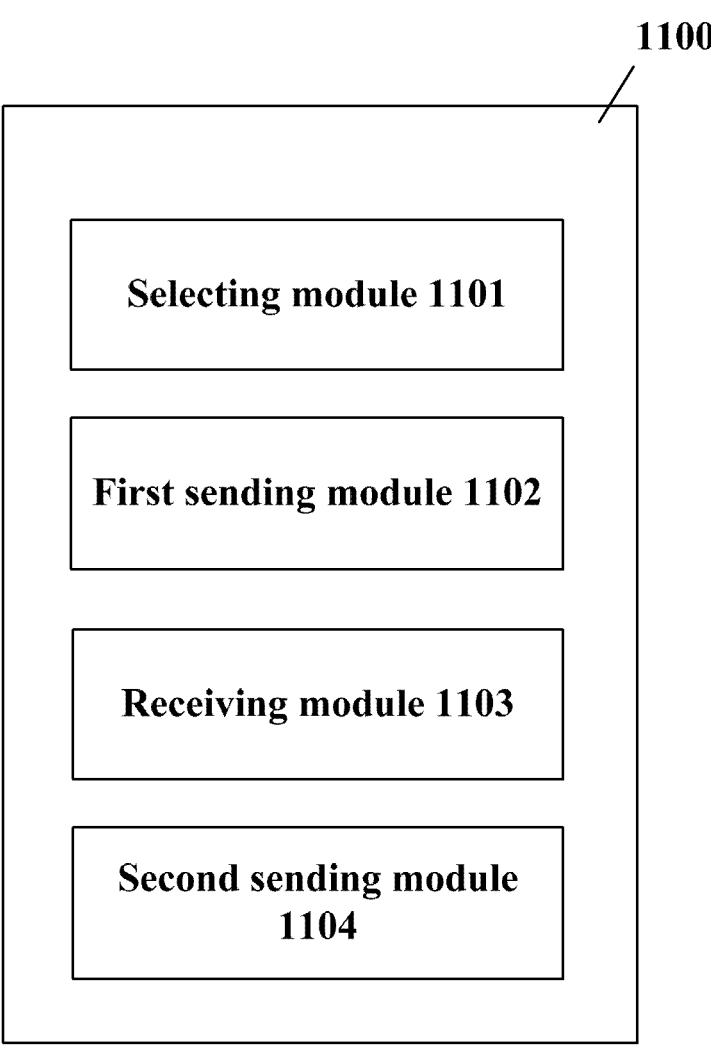
FIG. 11 is a block diagram showing an access and mobility function according to an embodiment of the disclosure.

FIG. 11 is a block diagram showing an access and mobility function according to an embodiment of the disclosure. As shown, the access and mobility function 1100 comprises a selecting module 1101 configured to select a second session management function (SMF) to serve a session of a user equipment (UE). The session of the UE is currently served by a first SMF and an access network. The access and mobility function 1100 further comprises a first sending module 1102 configured to send a create session management context request comprising a reason of selecting the second SMF to serve the session of the UE to the second SMF. The reason indicates that the session of the UE is still served by the access network. The access and mobility function 1100 further comprises a receiving module 1103 configured to receive a create session management context response comprising a session resource modify request from the second SMF. The session resource modify request comprises access network tunnel information of the access network. The access and mobility function 1100 further comprises a second sending module 1104 configured to send the session resource modify request to the access network.

Figure 12:
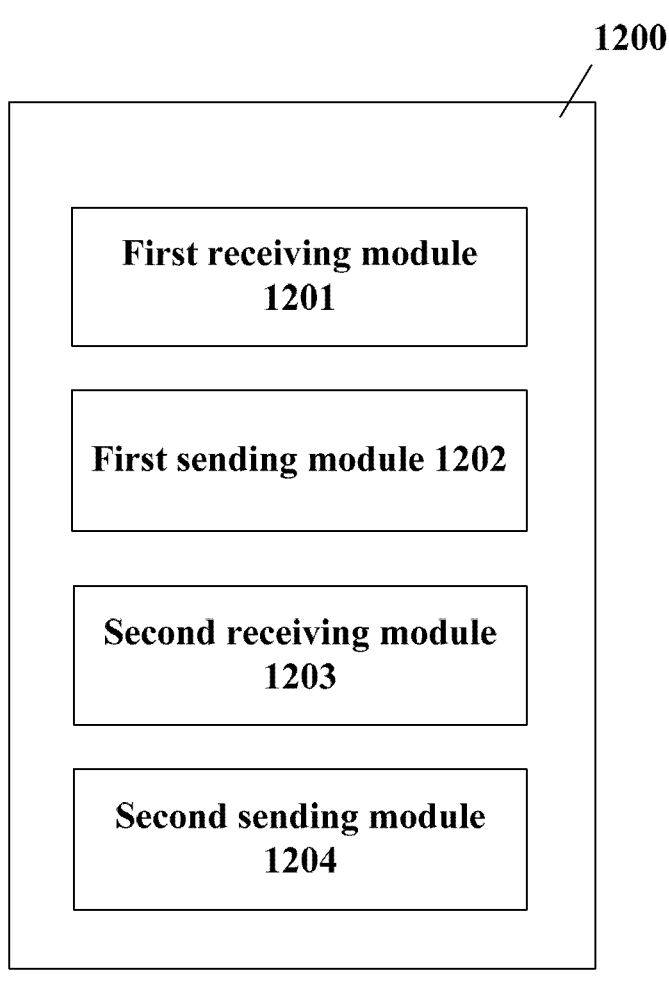
FIG. 12 is a block diagram showing a second session management function (SMF) according to an embodiment of the disclosure.

FIG. 12 is a block diagram showing a second session management function (SMF) according to an embodiment of the disclosure. As shown, the second SMF 1200 comprises a first receiving module 1201 configured to receive a create session management context request comprising a reason of selecting the second SMF to serve a session of a user equipment (UE) from an access and mobility function. The session of the UE is currently served by a first SMF and an access network. The reason indicates that the session of the UE is still served by the access network. The second SMF 1200 further comprises a first sending module 1202 configured to send a session context request comprising the reason of selecting the second SMF to serve the session of the UE to the first SMF. The second SMF 1200 further comprises a second receiving module 1203 configured to receive a session context response comprising the session management context of the session of the UE and tunnel information of the access network from the first SMF. The second SMF 1200 further comprises a second sending module 1204 configured to send a create session management context response comprising a session resource modify request to the access and mobility function. The session resource modify request comprises access network tunnel information of the access network received from the first SMF.

Figure 13:
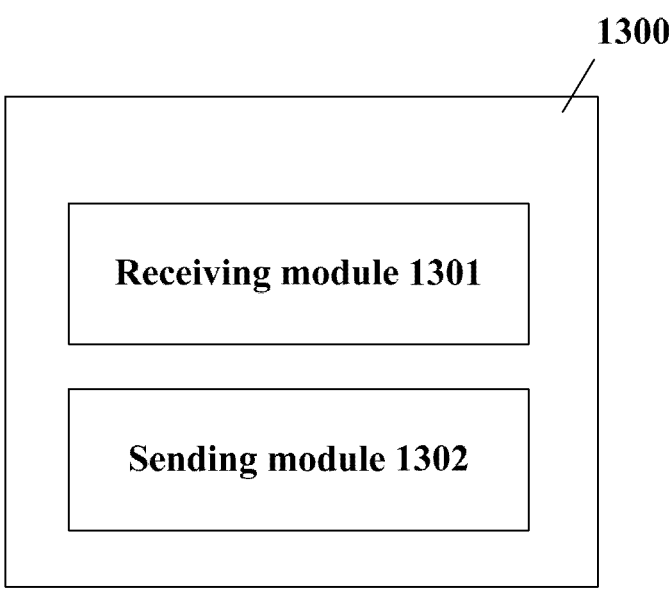
FIG. 13 is a block diagram showing a first session management function (SMF) according to an embodiment of the disclosure.

FIG. 13 is a block diagram showing a first session management function (SMF) according to an embodiment of the disclosure. As shown, the first SMF 1300 comprises a receiving module 1301 configured to receive a session context request comprising a reason of selecting a second SMF to serve a session of a user equipment (UE) from a second SMF. The session of the UE is currently served by the first SMF and an access network. The first SMF 1300 further comprises a sending module 1302 configured to send a session context response comprising the session management context of the session of the UE and tunnel information of the access network to the second SMF.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the access and mobility function, the first SMF or the second SMF may not need a fixed processor or memory, any computing resource and storage resource may be arranged from the access and mobility function, the first SMF or the second SMF in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by an access and mobility function, comprising:
    selecting a second session management function (SMF) to serve a session of a user equipment, wherein the session of the UE is currently served by a first SMF and an access network;
    sending a create session management context request comprising a reason of selecting the second SMF to serve the session of the UE to the second SMF, the reason indicating that the session of the UE is still served by the access network;
    receiving a create session management context response comprising a session resource modify request from the second SMF, the session resource modify request comprising access network tunnel information of the access network; and
    sending the session resource modify request to the access network.

2. The method according to claim 1, wherein the reason of selecting the second SMF to serve the session of the UE is based on a single-network slice selection assistance information (S-NSSAI) value.

3. The method according to claim 1, wherein the session resource modify request is a protocol data unit (PDU) session resource modify request.

4. The method according to claim 1, wherein the create session management context request is a Nsmf_PDUSession_CreateSMContext Request and the create session management context response is a Nsmf_PDUSession_CreateSMContext Response.

5. The method according to claim 1, wherein the session of the UE comprises a PDU session of the UE.

6. The method according to claim 1, wherein the create session management context request is sent after a completion of Evolved Packet System (EPS) to fifth generation system (5GS) Mobility Registration Procedure using N26 interface or EPS to 5GS handover using N26 interface.

7. The method according to claim 1, wherein the first SMF comprises a first intermediate SMF and the second SMF comprises a second intermediate SMF.

8. The method according to claim 1, wherein the first SMF comprises a first visited SMF and the second SMF comprises a second visited SMF.

9. A method performed by a second session management function, the method comprising:
    receiving a create session management context request comprising a reason of selecting the second SMF to serve a session of a user equipment (UE) from an access and mobility function, the session of the UE being currently served by a first SMF and an access network, the reason indicating that the session of the UE is still served by the access network;
    sending a session context request comprising the reason of selecting the second SMF to serve the session of the UE to the first SMF;
    receiving a session context response comprising the session management context of the session of the UE and tunnel information of the access network from the first SMF; and
    sending a create session management context response comprising a session resource modify request to the access and mobility function, the session resource modify request comprising the access network tunnel information of the access network received from the first SMF.

10. The method according to claim 9, wherein the reason of selecting the second SMF to serve the session of the UE is based on a single-network slice selection assistance information (S-NSSAI) value.

11. The method according to claim 10, wherein the session resource modify request is a protocol data unit (PDU) session resource modify request.

12. The method according to claim 9, wherein the create session management context request is a Nsmf_PDUSession_CreateSMContext Request and the create session management context response is a Nsmf_PDUSession_CreateSMContext Response.

13. The method according to claim 9, wherein the session of the UE is a PDU session of the UE.

14. The method according to claim 9, wherein the create session management context request is received after a completion of Evolved Packet System (EPS) to fifth generation system (5GS) Mobility Registration Procedure using N26 interface or EPS to 5GS handover using N26 interface.

15. The method according to claim 9, wherein the session context request is a Nsmf_PDUSession_Context Request and the session context response is a Nsmf_PDUSession_Context Response.

16. The method according to claim 9, wherein the first SMF comprises a first intermediate SMF and the second SMF comprises a second intermediate SMF.

17. The method according to claim 9, wherein the first SMF comprises a first visited SMF and the second SMF comprises a second visited SMF.

18. An access and mobility function, comprising:
a processor; and
a memory coupled to the processor, the memory containing instructions executable by the processor, whereby the access and mobility function is operative to:
select a second session management function (SMF) to serve a session of a user equipment (UE), the session of the UE being currently served by a first SMF and an access network;
send a create session management context request comprising a reason of selecting the second SMF to serve the session of the UE to the second SMF, the reason indicating that the session of the UE is still served by the access network;
receive a create session management context response comprising a session resource modify request from the second SMF, the session resource modify request comprising access network tunnel information of the access network; and
send the session resource modify request to the access network.

19. The access and mobility function according to claim 18, wherein the access and mobility function is configured such that the reason of selecting the second SMF to serve the session of the UE is based on a single-network slice selection assistance information (S-NSSAI) value.

20. A second session management function (SMF), comprising:
a processor; and
a memory coupled to the processor, the memory containing instructions executable by the processor, whereby the second SMF is operative to:
receive a create session management context request comprising a reason of selecting the second SMF to serve a session of a user equipment (UE) from an access and mobility function, the session of the UE being currently served by a first SMF and an access network, the reason indicating that the session of the UE is still served by the access network;
send a session context request comprising the reason of selecting the second SMF to serve the session of the UE to the first SMF;
receive a session context response comprising the session management context of the session of the UE and tunnel information of the access network from the first SMF; and
send a create session management context response comprising a session resource modify request to the access and mobility function, the session resource modify request comprises comprising access network tunnel information of the access network received from the first SMF.

21. The second SMF according to claim 20, wherein the second SMF is configured such that the reason of selecting the second SMF to serve the session of the UE is based on a single-network slice selection assistance information (S-NSSAI) value.

22. The access and mobility function according to claim 18, wherein the create session management context request is a Nsmf_PDUSession_CreateSMContext Request and the create session management context response is a Nsmf_PDUSession_CreateSMContext Response.

23. The second SMF according to claim 20, wherein the create session management context request is a Nsmf_PDUSession_CreateSMContext Request and the create session management context response is a Nsmf_PDUSession_CreateSMContext Response.

* * * * *